United States Patent Office 3,787,376
Patented Jan. 22, 1974

3,787,376
PROCESS FOR VULCANIZING POLYEPIHALO-
HYDRIN RUBBERS
Yoshiro Nakamura, Iwate, and Rikio Nagatomi, Tokyo, Japan, assignors to Nippon Zeon Co., Ltd., Tokyo, Japan
No Drawing. Filed Jan. 3, 1972, Ser. No. 215,106
Claims priority, application Japan, Dec. 31, 1970, 46/123,524, 46/123,525
Int. Cl. C08g 23/00
U.S. Cl. 260—79
17 Claims

ABSTRACT OF THE DISCLOSURE

New process for vulcanizing polyepihalohydrin rubbers by heating in the presence of trithiocyanuric acid and/or its derivative such as sodium trithiocyanurate. The vulcanized product has excellent aging stability, especially good strength at break after aging. Vulcanized polyepihalohydrin rubbers concurrently having enhanced oxidation-preventing properties can be obtained by performing the vulcanization in the co-presence of a 2-mercaptoimidazoline such as 2-mercaptoimidazoline, or a carbamate of a polyamine such as hexamethylenediamine carbamate.

This invention relates to a novel process for vulcanizing polyepihalohydrin rubbers. More specifically, the invention relates to a process for vulcanizing polyepihalohydrin rubbers by heating a polyepihalohydrin rubber in the presence of trithiocyanuric acid and/or its derivative, or in the presence of (a) trithiocyanuric acid or its derivative and (b) a 2-mercaptoimidazoline or a carbamate of a polyamine.

It has already been known that trithiocyanuric acid or its derivative proves effective as a vulcanization accelerator in the sulfur vulcanization of diene-type rubbers (see British Pat. 1,095,219), and as an anti-oxidant for diene-type rubbers (see U.S. Pat. 3,240,749).

It is an object of this invention to provide a new and useful process for vulcanizing polyepihalohydrin rubbers in the presence of trithiocyanuric acid and/or its derivative, thereby to give vulcanized products of far superior solvent resistance and resistance to aging under heat to those attained with the conventional techniques.

Another object of this invention is to provide a new and useful process for vulcanizing polyepihalohydrin rubbers in the presence of trithiocyanuric acid or its derivative, and a 2-mercaptoimidazoline or a carbamate of a polyamine, thereby to give polyepihalohydrin vulcanized products of such properties which further possess outstanding oxidation-preventing properties.

According to the invention, a cross-linked chain containing a triazine ring is formed by heating trithiocyanuric acid or its derivative with the side-chain halogen of a polyepihalohydrin rubber which has reactivity essentially different from that of the diene-type rubber, and its oxidation-preventing effect is utilized.

The trithiocyanuric acid or its derivatives used in the present invention are compounds having the following General Formula I, II, III, IV, or V.

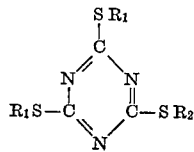

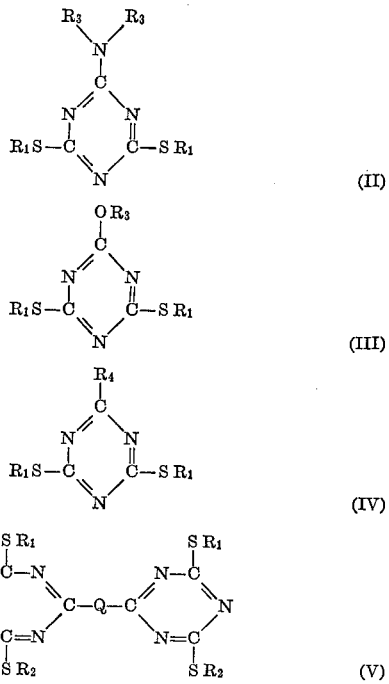

In these formulae, $R_1$ is H or an alkali metal; $R_2$ is H, an alkali metal, $C_nH_{2n+1}$, or $C_6H_5$; $R_3$ is H, $C_nH_{2n+1}$, $C_6H_5$, $C_6H_{11}$ (cyclohexyl), $CH_2CH=CH_2$, or $C_{10}H_6$ (naphthyl); $R_4$ is $C_6H_5$, $N(CH_2)_4O$ (morpholino), $N(CH_2)_5$ (piperazino), or $C_{10}H_6$ (naphthyl); Q is $OC_nH_{2n}O$, $OCH_2(CH_2OCH_2)_nCH_2O$, $SC_nH_{2n}S$, or $SCH_2(CH_2OCH_2)_nCH_2S$; and $n$ is a positive integer.

Typical examples of these compounds include trithiocyanuric acid and its alkali metal salts, and 2-(n-octylthio)-4,6-dimercapto-s-triazine or its alkali metal salts, which correspond to Formula I; 2-diphenylamino-1,6-dimercapto-s-triazine, 2 - diethylamino-4,6-dimercapto-s-triazine, 2-naphthylamino-4,6-dimercapto-s-triazine, and 2-anilino-4,6-dimercapto-s-triazine, and alkali metal salts of these, which correspond to Formula II; 2-phenoxy-4,6-dimercapto - s - triazine, 2 - ethoxy - 4,6 - dimercapto-s-triazine, and alkali metal salts of these, which correspond to Formula III; 2 - phenyl - 4,6 - dimercapto - s - triazine, 2 - morpholino - 4,6 - dimercapto - s - triazine, 2-piperizyl-4,6 - dimercapto - s - triazine, and alkali metal salts of these, which correspond to Formula IV; and 6-(diethylene glycol dithio)-2,4 - bis(dimercapto) - s - triazine and its alkali metal salts, which correspond to Formula V.

Of these compounds, the alkali metal salts generally have the greatest reactivity with the side-chain halogen of a polyepihalohydrin rubber. The reactivities of some typical alkali metal salts increase in the order shown below.

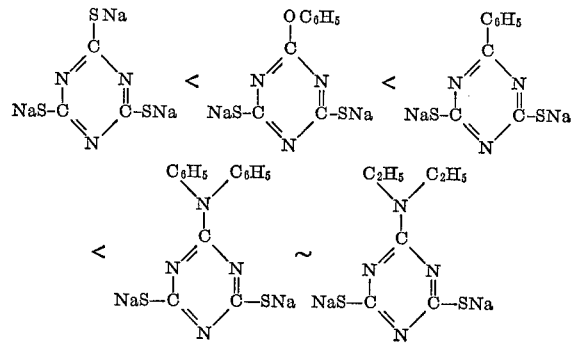

Of those compounds which have a free mercapto group not forming an alkali metal salt, the compounds of the Formula II are preferred. These compounds have almost equivalent reactivities to the alkali metal salts.

The polyepihalohydrin rubbers to be vulcanized in accordance with the process of the invention are homopolymers of epichlorohydrin or epibromohydrin, and copolymers of epihalohydrins and copolymerizable monomers. Examples of the copolymerizable monomers are epoxides such as ethylene oxide, propylene oxide, butylene oxide, butadiene monoxide, cyclohexene oxide, ethyl glycidyl ether, allyl glyceridyl ether, tetrahydrofuran or trioxane; isocyanates such as ethyl isocyanate, phenyl isocyanate, or 2,4-tolylene diisocyanate; alkyl acrylates such as ethyl acrylate or methyl methacrylate; vinyl ketones such as methyl vinyl ketone or cyclohexyl vinyl ketone; cyclic acid anhydrides such as maleic anhydrides, succinic anhydride, or phthalic anhydride; diolefins such as butadiene, isoprene, or pentadiene; monoolefins such as ethylene, propylene, or butene-1; nitrile compounds such as acrylonitrile or methacrylonitrile; and butylene. Furthermore, kneaded mixtures of these polymers with diene-type rubbers or chlorinated rubbers may also be used. In other words, the process of the present invention is applicable to any polymer which substantially contains an epihalohydrin.

The amount of trithiocyanuric acid or its derivative used in the invention is usually from 0.5 to 5 parts by weight per 100 parts by weight of the polyepihalohydrin rubber. But amounts in excess of 5 parts by weight may also be employed without any appreciable trouble since if being present in the vulcanized product in the unreacted state, this compound also acts effectively as an antioxidant.

A first embodiment of the process of the invention is performed by heating the polyepihalohydrin rubber in the presence of trithiocyanuric acid and/or its derivative described above. In order to enhance the cross-linking reactivity further, the heating may be effected in the copresence of a vulcanization accelerator or vulcanization assistant. Suitable examples of the vulcanization accelerator or assistant include alkali metal salts or alkaline earth metal salts of aromatic or aliphatic or polybasic acids (for example, benzoic acid, phthalic acid, acetic acid, stearic acid, adipic acid, or azelaic acid); alkali metal salts of cyanuric acid; oxides, hydroxides, sulfides, carbonates, or phosphates of alkali metals or alkaline earth metals; thioacid salts such as sodium ethylxanthate; dithioacid salts such as sodium dithiocarbamate, sodium dimethyldithiocarbamate, or piperidine-pentamethylene dithiocarbamate; thiazoles such as 2-mercaptobenzothiazole, dibenzothiazyl sulfide, or N-cyclohexylbenzothiazyl sulphenamide; 2-mercaptothiazoline; 2-mercaptobenzimidazole; urea derivatives such as ethylene urea or diphenyl urea; thiourea derivatives such as triethyl thiourea, diphenyl thiourea, tributyl thiourea, tetraethyl thiourea, or thiocarbanilide; guanidine derivatives such as diphenyl gaunidine; thiuram compounds such as tetramethyl thiuram mono- or disulfide; and sulfur and monoaminies or polyamines such as laurylamine, hexamethylene diamine, piperazine, or melamine. Sulfur is especially preferred. These compounds are used either alone or in admixture of two or more. The amount of the vulcanization assistant or accelerator used is from 0 to 10 parts by weight per 100 parts by weight of the polyepihalohydrin rubber.

In a second embodiment of the process of the invention, the vulcanization of the polyepihalohydrin rubber is performed in the presence of (a) trithiocyanuric acid or its derivative described above and (b) a 2-mercaptoimidazoline or a carbamate of a polyamine. The conjoint use of the compound (b) is designed to enhance the cross-linking reactivity. Typical examples of the 2-mercapto- imidazoline include 2-mercaptoimidazoline, 4-methyl-2-mercaptoimidazoline and 5-ethyl-4-butyl-2-mercaptoimidazoline. Examples of the carbamate of a polyamine are hexamethylenediamine carbamate and ethylenediamine carbamate. The compound (b) is already known as one component of a vulcanizing agent for polyepihalohydrin rubbers. It however acts effectively as an accelerator for compound (a) in the present invention even in so small an amount which would not fully prove effective when used in accordance with the known methods. The use of the compound (b) together with the compound (a) leads to vulcanized products of very superior resistance to aging under heat. The amount of the compound (b) used is from 0.1 to 10 parts by weight per 100 parts by weight of the polyepihalohydrin rubber.

The other conditions applicable to the case of using the compound (b) conjointly are the same as those hereinabove described.

As is demonstrated by Examples 40 and 43 for instance, the vulcanized polyepihalohydrin rubbers obtained by the process of the present invention hardly undergo a reduction in strength even by heat aging at 150° C. for 20 days, and possess excellent resistance to aging under heat which cannot be seen in polyepihalohydrin rubber vulcanizates having a cross-linked chain such as monosulfide, disulfide, or alkylene that have generally been known heretofore. These properties are considered to be exhibited by the following factors (1) to (4).

(1) Stabilization of the cross-linked chain by a large resonance energy possessed by the s-triazine ring.

(2) Powerful insulating effect of the cross-linked chain (trithiocyanuric acid ring) against the inducing action of the main chain molecules between the cross-linked chains which action accelerates thermal decomposition.

(3) Steric hindrance effect of the s-triazine ring at the time of forming a sulfonium salt with the sulfide linkage which induces the activation of the unreacted halogen that becomes a cause of thermal decomposition of the polyepihalohydrin rubber vulcanizate.

(4) The vulcanizing agent itself has an effect of preventing oxidation, and the resultant cross-linked chain assumes a structure similar to that of an alkylthithiocyanuric acid that exhibits good prevention of oxidation and acts as a durable cross-linking stabilizer.

In either the first or second embodiment of the invention, the vulcanization is performed by mixing trithiocyanuric acid and/or its derivative (first embodiment) or compounds (a) and (b) mentioned above (second embodiment) with the polyepihalohydrin rubber together, if desired, with the assistant described above by an ordinary method such as roll mixing, Bumbury mixing, or solution mixing, and then heating the resultant mixture. The vulcanization temperature is usually from 120° C. to 190° C., and the vulcanization time is from about 5 to 120 minutes.

If desired, ordinary chemicals for rubber such as reinforcing agents, fillers, softening agents, plasticizers, antioxidants, stabilizers or activators may be added besides the vulcanizing agents.

The invention will be described specifically by the following examples in which all figures in the compounding recipes are parts by weight.

EXAMPLES 1 TO 5 AND COMPARATIVE EXAMPLE 1

In each run, the ingredients of the recipe shown in Table 1 were kneaded for about 30 minutes at 30–40° C. with a 6-inch roll, and then vulcanized at 160° C. for 40 minutes. The physical properties, gell content, and degree of swelling of the vulcanized products obtained were measured both before and after aging under heat. The results are given in Table 2.

TABLE 1

| Compounding recipe | Example | | | Comp. Ex. 1 | Example | |
|---|---|---|---|---|---|---|
| | 1 | 2 | 3 | | 4 | 5 |
| Polyepichlorohydrin rubber [a] | 100 | 100 | 100 | 100 | 100 | 100 |
| FEF carbon black | 40 | 40 | 40 | 40 | 40 | 40 |
| Tin stearate | 1 | 1 | 1 | 1 | 1 | 1 |
| Trithiocyanuric acid | 1 | 1.5 | 2 | | 0.5 | 1 |
| 2-mercaptoimidazoline | 0.2 | 0.3 | 0.5 | 1.5 | 1 | 1 |
| Magnesium oxide | 5 | 5 | 5 | 5 | 5 | 5 |

[a] Hydrin 100 (trade name, Goodrich Company: this applies to all of the polyepichlorohydrin rubbers used in the examples).

TABLE 2

| | Example 1 | | | | Example 2 | | | | Example 3 | | | |
|---|---|---|---|---|---|---|---|---|---|---|---|---|
| | | 150° C. | | | | 150° C. | | | | 150° C. | | |
| Aging conditions | Before aging | After 3 days | After 12 days | After 20 days | Before aging | After 3 days | After 9 days | After 20 days | Before aging | After 3 days | After 12 days | After 20 days |
| Strength at break (kg./cm.²) | 126 | 159 | 128 | 87 | 137 | 153 | 152 | 121 | 137 | 158 | 149 | 135 |
| Elongation at break (percent) | 348 | 270 | 270 | 253 | 217 | 162 | 165 | 150 | 150 | 115 | 105 | 120 |
| 100% modulus (kg./cm.²) | 46 | 63 | 53 | 36 | 80 | 108 | 113 | 95 | 104 | 140 | 145 | 128 |
| 200% modulus (kg./cm.²) | 96 | 136 | 106 | 72 | 132 | | | | | | | |
| Hardness (Shore A) | 68 | 73 | 70 | 64 | 77 | 77 | 81 | 80 | 81 | 82 | 82 | 83 |
| Gell content (percent) [a] | 99.3 | 98.1 | 93.4 | 90.0 | 98.9 | 98.4 | | 94.0 | 100 | 99.4 | 97.4 | 94.2 |
| Degree of swelling (percent) [a] | 290 | 286 | 345 | 365 | 240 | 233 | | 256 | 222 | 229 | 229 | 244 |

| | Comparative Example 1 | | | | Example 4 | | | | Example 5 | | |
|---|---|---|---|---|---|---|---|---|---|---|---|
| | | 150° C. | | | | 155° C. | | | | 160° C. | |
| Aging conditions | Before aging | After 3 days | After 12 days | After 20 days | Before aging | After 3 days | After 6 days | After 9 days | After 12 days | Before aging | After 3 days | After 6 days |
| Strength at break (kg./cm.²) | 119 | 148 | 90 | 45 | 153 | 160 | 146 | 121 | 108 | 130 | 135 | 128 |
| Elongation at break (percent) | 533 | 290 | 300 | 320 | 250 | 190 | 190 | 195 | 200 | 190 | 100 | 126 |
| 100% modulus (kg./cm.²) | 34 | 69 | 50 | 27 | 65 | 83 | 80 | 60 | 60 | 75 | 135 | 120 |
| 200% modulus (kg./cm.²) | 68 | 128 | 80 | 40 | | | | | | | | |
| Hardness (Shore A) | 66 | 74 | 72 | 63 | 75 | 78 | 77 | 74 | 74 | 76 | 81 | 80 |
| Gell content (percent) | 98.9 | 98.2 | 87.0 | 80.7 | | | | | | | | |
| Degree of swelling (percent) | 338 | 299 | 388 | 478 | | | | | | | | |

[a] Tested after immersion in tetrahydrofuran for 48 hours (this equally applies to the following examples).

It is seen from the results of strength at break in Table 2 that by the present invention, excellent vulcanized products of polyepihalohydrin rubbers which can fully endure aging under heat for prolonged periods of time can be obtained. Even in a small amount, the 2-mercaptoimidazoline clearly exhibits its effect. On the other hand, when trithiocyanuric acid is not used as in Comparative Example 1, the vulcanizate suffers from a marked reduction in strength due to aging under heat.

COMPARATIVE EXAMPLES 2 TO 4

Using the typical conventional vulcanizing agents, the ingredients were kneaded and vulcanized in the same way as set forth in Example 1. The physical properties, gell content, and degree of swelling of the vulcanizates were measured both before and after aging under heat. The compounding recipe and the results of measurement are given in Table 3.

It is clear from the results shown in Table 3 that in either case, a reduction in strength due to aging under heat was remarkable.

EXAMPLE 6

A vulcanizate of polyepichlorohydrin rubber was prepared in the same way as set forth in Example 3 except that 3 parts by weight of 2-phenyl-4,6-dimercapto-s-triazine was used instead of 2 parts by weight of trithiocyanuric acid. The heat aging test was conducted at 150° C. The results are shown in Table 4.

TABLE 4

| | Aging conditions | | | |
|---|---|---|---|---|
| Physical properties | Before aging | After 3 days | After 12 days | After 20 days |
| Strength at break (kg./cm.²) | 135 | 176 | 139 | 94 |
| Elongation at break (percent) | 241 | 217 | 200 | 230 |
| 100% modulus (kg./cm.²) | 70 | 90 | 80 | 55 |
| 200% modulus (kg./cm.²) | 125 | 172 | 139 | 90 |
| Hardness (Shore A) | 74 | 78 | 80 | 76 |
| Gell content (percent) | 99.6 | 99.0 | 95.2 | 89.9 |
| Degree of swelling (percent) | 253 | 252 | 295 | 355 |

EXAMPLE 7

A vulcanizate of polyepichlorohydrin rubber was prepared in the same way as set forth in Example 1 except that 2 parts by weight of sodium adipate was further

TABLE 3

| | Comparative Example 2 | | | | Comparative Example 3 | | | | | Comparative Example 4 | | | | |
|---|---|---|---|---|---|---|---|---|---|---|---|---|---|---|
| Compound recipe: | | | | | | | | | | | | | | |
| Polyepichlorohydrin rubber | 100 | | | | 100 | | | | | 100 | | | | |
| FEF carbon black | 40 | | | | 40 | | | | | 40 | | | | |
| Tin stearate | 1 | | | | 1 | | | | | 1 | | | | |
| Trithiocyanuric acid | | | | | | | | | | | | | | |
| 2-mercaptoimidazoline | 1.5 | | | | 1 | | | | | 1 | | | | |
| Red lead | 5 | | | | 5 | | | | | 5 | | | | |

| | | 150° C. | | | | 160° C. | | | | | 160° C. | | | |
| Aging conditions | Before aging | After 3 days | After 12 days | After 20 days | Before aging | After 3 days | After 6 days | After 9 days | After 12 days | Before aging | After 3 days | After 6 days | After 9 days | After 12 days |
| Physical properties: | | | | | | | | | | | | | | |
| Strength at break (km./cm.²) | 142 | 173 | 77 | 32 | 159 | 173 | 121 | 67 | 26 | 134 | 141 | 41 | 13 | 9 |
| Elongation at break (percent) | 405 | 233 | 300 | 315 | 520 | 280 | 275 | 310 | 320 | 532 | 258 | 300 | 293 | 214 |
| 100% modulus (kg./cm.²) | 45 | 80 | 36 | 19 | 38 | 63 | 15 | 3 | | 39 | 49 | 19 | 10 | 8 |
| 200% modulus (kg./cm.²) | [a]126 | 165 | 61 | 28 | | | | | | [a]107 | | | | |
| Hardness (Shore A) | 71 | 71 | 69 | 60 | 64 | 73 | 71 | 62 | 54 | 70 | 76 | 60 | 55 | 35 |
| Gell content (percent) | 100 | 93.7 | 87.7 | 81.8 | | | | | | 97.7 | 95.6 | 79.9 | | |
| Degree of swelling (percent) | 263 | 248 | 363 | 401 | | | | | | 308 | 269 | 372 | | |

[a] 300%.

added to the recipe. The vulcanizate was tested at 160° C. as to its aging stability. The results are shown in Table 5 below.

TABLE 5

| Physical properties | Aging conditions | | | | |
|---|---|---|---|---|---|
| | Before aging | After 3 days | After 6 days | After 9 days | After 12 days |
| Strength at break (kg./cm.²) | 113 | 149 | 146 | 130 | 103 |
| Elongation at break (percent) | 320 | 127 | 150 | 137 | 183 |
| 100% modulus (kg./cm.²) | 56 | 97 | 107 | 99 | 73 |
| 200% modulus (kg./cm.²) | 113 | | | | |
| Hardness (Shore A) | 75 | 80 | 81 | 81 | 80 |
| Gell content (percent) | 97 | 98.5 | 97.7 | 95.5 | 94.0 |
| Degree of swelling (percent) | 264 | 223 | 228 | 227 | 249 |

EXAMPLES 9 TO 12

Each of the compound mixtures shown in Table 7 below containing trithiocyanuric acid and hexamethylenediamine carbamate was vulcanized at 160° C. for 40 minutes. The results of the heat aging test (at 160° C.) of the vulcanizates are shown in Table 7 also. In any case, a vulcanized product having excellent resistance to aging under heat could be obtained. The use of the antioxidant conjointly can further increase the strength at break of the vulcanized products.

TABLE 7

| | Example 9 | Example 10 | Example 11 | Example 12 |
|---|---|---|---|---|
| Compounding recipe: | | | | |
| Polyepichlorohydrin | 100 | 100 | 100 | 100 |
| FEF carbon black | 40 | 40 | 40 | 40 |
| Tin stearate | 1 | 1 | 2 | 2 |
| Trithiocyanuric acid | 1.5 | 2 | 2 | 2 |
| Hexamethylene diamine carbamate | 0.5 | 1 | 1 | 1 |
| Magnesium oxide | 5 | 5 | 5 | 5 |
| Sulfur | | | | 1 |
| Nickel dibutyl dithiocarbamate | | | 0.5 | 0.5 |
| Phenyl-3-naphthylamine | | | 1 | 1 |

| Number of days for aging | 0 | 3 | 6 | 9 | 12 | 0 | 3 | 6 | 9 | 12 | 0 | 3 | 6 | 9 | 12 | 0 | 3 | 6 | 9 | 12 |
|---|---|---|---|---|---|---|---|---|---|---|---|---|---|---|---|---|---|---|---|---|
| Properties of the vulcanized product: | | | | | | | | | | | | | | | | | | | | |
| Strength at break (kg./cm.²) | 152 | 112 | 75 | 42 | 25 | 155 | 126 | 100 | 59 | 30 | 140 | 140 | 138 | 121 | 107 | 141 | 127 | 136 | 117 | 105 |
| Elongation at break (percent) | 306 | 240 | 200 | 133 | | 276 | 175 | 160 | 110 | | 228 | 110 | 110 | 110 | 100 | 184 | 100 | 100 | 97 | 100 |
| 100% modulus (kg./cm.²) | 67 | 63 | 31 | | | 70 | 85 | 80 | | | 81 | 136 | 128 | | | 100 | 129 | | | |
| 200% modulus (kg./cm.²) | 124 | 104 | | | | 130 | | | | | 135 | | | | | | | | | |
| 300% modulus (kg./cm.²) | 151 | | | | | | | | | | | | | | | | | | | |
| Hardness (Shore A) | 76 | 76 | 77 | 80 | 80 | 76 | 80 | 81 | 81 | 81 | 79 | 82 | 85 | 87 | 86 | 81 | 85 | 87 | 88 | 87 |

EXAMPLE 8

A vulcanizate of polyepichlorohydrin was prepared in the same was as set forth in Example 7 except that 3 parts by weight of 2-diphenylamino-4,6-dimercapto-s-triazine was used instead of 1.5 parts by weight of trithiocyanuric acid. The vulcanizate obtained was tested at 160° C. as to its aging stability under heat. The results are shown in Table 6.

TABLE 6

| Physical properties | Aging conditions | | | | |
|---|---|---|---|---|---|
| | Before aging | After 3 days | After 6 days | After 9 days | After 12 days |
| Strength at break (kg./cm.²) | 117 | 138 | 127 | 109 | 97 |
| Elongation at break (percent) | 268 | 148 | 195 | 163 | 160 |
| 100% modulus (kg./cm.²) | 63 | 95 | 78 | 73 | 65 |
| 200% modulus (kg./cm.²) | 108 | | | | |
| Hardness (Shore A) | 76 | 78 | 78 | 75 | 72 |
| Gell content (percent) | 98.5 | 99.1 | 97.4 | 94.8 | 93.0 |
| Degree of swelling (percent) | 256 | 234 | 240 | 250 | 281 |

EXAMPLES 13 TO 23 AND COMPARATIVE EXAMPLE 5

In each run, a mixture of polyepichlorohydrin rubber with trithiocyanuric acid and 2-mercaproimidazoline and various assistants was vulcanized at 160° C. for 40 minutes, and the physical properties of the resulting vulcanizate were measured. The compound recipes and the results obtained are shown in Table 8. It is seen from the results that good vulcanized products of the polyepichlorohydrin rubber were obtained.

TABLE 8

| Example Number | 13 | 14 | 15 | 16 | 17 | 18 | 19 | 20 | 21 | 22 | 23 | Comp. Ex. 6 |
|---|---|---|---|---|---|---|---|---|---|---|---|---|
| Compounding recipe: | | | | | | | | | | | | |
| Polyepichlorohydrin rubber | 100 | 100 | 100 | 100 | 100 | 100 | 100 | 100 | 100 | 100 | 100 | 100 |
| FEF carbon black | 40 | 40 | 40 | 40 | 40 | 40 | 40 | 40 | 40 | 40 | 40 | 40 |
| Tin stearate | 1 | 1 | 1 | 1 | 1 | 1 | 1 | 1 | 1 | 1 | 1 | 1 |
| Trithiocyanuric acid | 2 | 2 | 2 | 2 | 2 | 2 | 2 | 2 | 2 | 2 | 2 | |
| 2-mercaptoimidazoline | 0.5 | 0.5 | 0.5 | 0.5 | 0.5 | 0.5 | 0.5 | 0.5 | 0.5 | 0.5 | 0.5 | 0.5 |
| Magnesium oxide | | | 2 | 5 | 5 | | | | | | | |
| Sodium sebacate | 1 | 1 | | | | | | | | | | |
| Sulfur | | | | | 1 | 0.5 | | | | | | |
| Lead sulfide | | | | | | 5 | | | | | | |
| Basic lead carbonate | | | | | | | 5 | | | | | |
| Barium oxide | | | | | | | | 5 | | | | |
| Calcium oxide | | | | | | | | | 5 | | | |
| Barium sulfide | | | | | | | | | | 5 | | |
| Calcium hydroxide | | | | | | | | | | | | |
| Calcium hydroxide | | | | | | | | | | 5 | | |
| Barium carbonate | | | | | | | | | | | 5 | |
| Red lead | | | | | | | | | | | | 5 |
| 2-mercaptobenzimidazole | | 1 | | | | | | | | | | |
| Physical properties of the vulcanized product: | | | | | | | | | | | | |
| Strength at break (kg./cm.²) | 113 | 140 | 145 | 141 | 123 | 120 | 110 | 120 | 105 | 135 | 140 | 93 |
| Elongation at break (percent) | 500 | 270 | 310 | 210 | 370 | 380 | 400 | 180 | 500 | 170 | 150 | 650 |
| 100% modulus (kg./cm.²) | 39 | 58 | 76 | 86 | 47 | 46 | 45 | 74 | 41 | 90 | 103 | 51 |
| 300% modulus (kg./cm.²) | 95 | ᵃ114 | 141 | | 113 | 110 | 100 | | 72 | | | 67 |
| Hardness (Shore A) | 70 | 74 | 79 | 77 | 70 | 68 | 76 | 78 | 72 | 76 | 78 | |

ᵃ 200%.

EXAMPLE 24

The vulcanized product obtained in Example 16 was aged at 160° C. The physical properties were measured, and the results are shown in Table 9.

TABLE 9

| Physical properties | Number of days for aging | | | |
|---|---|---|---|---|
| | 3 | 6 | 9 | 12 |
| Strength at break (kg./cm.²) | 151 | 150 | 127 | 78 |
| Elongation at break (percent) | 110 | 110 | 103 | 100 |
| 100% modulus (kg./cm.²) | 147 | 142 | ------ | ------ |
| Hardness (Shore A) | 84 | 83 | 83 | 78 |

EXAMPLES 25 TO 32

A kneaded mixture of 100 parts of polyepichlorohydrin rubber, 40 parts of FEF carbon black, 1 part of tin stearate, 0.3 part of 2-mercaptoimidazoline, 5 parts of magnesium oxide, 0.5 part of nickel dibutyl dithiocarbamate, 1 part of 2-mercaptobenzimidazole, and the trithiocyanuric acid derivative of the amount shown in Table 10 was vulcanized at 160° C. for 40 minutes. The resulting vulcanizate was aged at 160° C. for 12 days, and the physical properties were measured. The results are shown in Table 10.

EXAMPLE 33 AND COMPARATIVE EXAMPLE 6

In each run, a kneaded mixture of the ingredients shown in Table 11 was vulcanized at 160° C. for 40 minutes. The resulting vulcanize was aged at 160° C., and the physical properties were measured. The results obtained are shown in Table 11. It is seen from the results that the vulcanizate of the invention obtained in the presence of trithiocyanuric acid retains good strength at break even when aged for prolonged periods of time.

EXAMPLES 34 AND 35

A kneaded mixture of 100 parts of polyepichlorohydrin rubber, 40 parts of FEF carbon black, 1 part of tin stearate, 5 parts of magnesium oxide, 2 parts of trithiocyanuric acid, and 0.3 part of 2-mercaptoimidazoline (Example 34) and a kneaded mixture consisting of the above mixture and 0.5 part each of nickel dibutyl dithiocarbamate, diphenyl guanidine and 2-mercaptobenzimidazole as anti-oxidants (Example 35) were vulcanized respectively at 160° C. for 40 minutes. The resultant vulcanizates were aged at 160° C., and the physical properties were measured. The results are given in Table 12.

TABLE 10

| Trithiocyanuric acid derivatives (parts by weight) | 2-diethylamino-4,6-dimercapto-s-triazine (2.7) | | 2-anilino-4,6-dimercapto-s-triazine (3) | | 2-dicyclohexylamino-4,6-dimercapto-s-triazine (4) | | 2-morpholino-4,6-dimercapto-s-triazine (3) | | 2-phenylnaphthylamino-4,6-dimercapto-s-triazine (4.6) | | 2-diisopropylamino-4,6-dimercapto-s-triazine (3) | | 2-methoxy-4,6-dimercapto-s-triazine (2.2) | | 2-phenyl-4,6-dimercapto-s-triazine (2.8) | |
|---|---|---|---|---|---|---|---|---|---|---|---|---|---|---|---|---|
| Example number | 25 | | 26 | | 27 | | 28 | | 29 | | 30 | | 31 | | 32 | |
| Before or after aging | Before | After | Before | After | Before | After | Before | After | Before | After | Before | After | Before | After | Before | After |
| Strength at break (kg./cm.²) | 122 | 114 | 137 | 91 | 147 | 129 | 139 | 115 | 140 | 110 | 142 | 110 | 155 | 130 | 107 | 100 |
| Elongation at break (percent) | 143 | 57 | 270 | 50 | 193 | 80 | 93 | 27 | 203 | 67 | 190 | 67 | 127 | 47 | 180 | 93 |
| 100% modulus (kg./cm.²) | 101 | ------ | 66 | ------ | 100 | ------ | ------ | ------ | 95 | ------ | 94 | ------ | 144 | ------ | 74 | ------ |
| Hardness (Shore A) | 80 | 88 | 74 | 87 | 78 | 87 | 86 | 90 | 77 | 88 | 79 | 88 | 82 | 90 | 78 | 87 |

TABLE 11

| | Comparative Example 8 | | | | Example 33 | | | |
|---|---|---|---|---|---|---|---|---|
| Compounding recipe: | | | | | | | | |
| Polyepichlorohydrin rubber | 100 | | | | 100 | | | |
| FEF carbon black | 40 | | | | 40 | | | |
| Tin stearate | 2 | | | | 2 | | | |
| Magnesium oxide | 5 | | | | 5 | | | |
| Nickel dibutyl dithiocarbamate | 0.5 | | | | 0.5 | | | |
| Diphenyl guanidine | 1 | | | | 1 | | | |
| 2-mercaptobenzimidazole | 2 | | | | 2 | | | |
| Hexamethylene diamine carbamate | 0.5 | | | | 0.5 | | | |
| Trithiocyanuric acid | ------ | | | | 1 | | | |
| Sulfur | 1 | | | | ------ | | | |
| Number of days for aging | 0 | 3 | 6 | 9 | 12 | 0 | 3 | 6 | 9 | 12 |
| Physical properties of the vulcanized product: | | | | | | | | | | |
| Strength at break (kg./cm.²) | 141 | 145 | 141 | 102 | 50 | 146 | 156 | 134 | 138 | 143 |
| Elongation at break (percent) | 462 | 116 | 134 | 116 | ------ | 250 | 100 | 90 | 90 | 90 |
| 100% modulus (kg./cm.²) | 38 | 136 | 122 | 97 | 80 | 80 | ------ | 74 | 97 | 97 |
| Hardness (Shore A) | 73 | 86 | 86 | 86 | 88 | 80 | 86 | 87 | 87 | 87 |

Although it is not essential to use an antioxidant in the present invention, the use of an antioxidant is effective for retaining good strength even after aging for prolonged periods of time, as is seen from Table 12.

It is seen from the results shown in Table 14 that the vulcanized products obtained by the invention have good physical properties. As is seen especially from the results of the strength at break and gell content, the vulcanizates

TABLE 12

|  | Example 34 | | | | | Example 35 | | | | |
| --- | --- | --- | --- | --- | --- | --- | --- | --- | --- | --- |
| Number of days for aging | 0 | 3 | 6 | 9 | 12 | 0 | 3 | 6 | 9 | 12 |
| Physical properties of the vulcanized product: | | | | | | | | | | |
| Strength at break (kg./cm.$^2$) | 136 | 153 | 138 | 108 | 81 | 153 | 154 | 140 | 125 | 109 |
| Elongation at break (percent) | 150 | 123 | 120 | 120 | 103 | 140 | 100 | 89 | 87 | 87 |
| 100% modulus (kg./cm.$^2$) | 105 | 146 | 124 | 105 | | 140 | | | | |
| Hardness (Shore A) | 81 | 83 | 84 | 84 | 83 | 83 | 85 | 85 | 86 | 86 |

EXAMPLES 36 TO 42 AND COMPARATIVE EXAMPLE 7

In each run, the ingredients of the recipe shown in Table 13 were kneaded for about 30 minutes at 30–40° C., and then vulcanized at 160° C. for 40 minutes. The physical properties, gel content, and degree of swelling of the resulting vulcanizates were measured before and after aging at 150° C. The results are shown in Table 14.

obtained by the invention can fully endure aging under heat for prolonged periods of time. Comparative Example 7 shows the results obtained with a typical conventional vulcanizing agent, from which it is seen that the vulcanizate aged for more than 12 days exhibits a marked reduction in strength and gell content, showing a tendency toward softening and deterioration.

EXAMPLES 43 TO 48

A vulcanized polyepichlorohydrin rubber was prepared from the compounding recipe shown in Table 15 in which the amount of trithiocyanuric acid was decreased as compared with Example 38 and a vulcanization accelerator

TABLE 13

| Compounding recipe | Example | | | | | | | Comp. Ex. 7 |
| --- | --- | --- | --- | --- | --- | --- | --- | --- |
|  | 36 | 37 | 38 | 39 | 40 | 41 | 42 |  |
| Polyepichlorohydrin rubber | 100 | 100 | 100 | 100 | 100 | 100 | 100 | 10 |
| FEF carbon black | 40 | 40 | 40 | 40 | 40 | 40 | 40 | 40 |
| Tin stearate | 1 | 1 | 1 | 1 | 1 | 1 | 1 | 1 |
| Trithiocyanuric acid | 3 | | 5 | | | | | |
| Sodium trithiocyanurate | | 3 | | | | | | |
| 2-diphenylamino-4,6-dimercapto-s-triazine | | | | 3 | | | | |
| 2-diphenylamino-4,6-dimercapto-s-triazine sodium salt | | | | | 3.5 | | | |
| 2-phenoxy-4,6-dimercapto-s-triazine | | | | | | 3.5 | | |
| 2-ethoxy-4,6-dimercapto-s-triazine | | | | | | | 3 | |
| Magnesium oxide | 5 | 5 | 5 | | | 5 | 5 | |
| Sodium adipate | 5 | | | | | 2 | 2 | |
| 2-mercaptoimidazoline | | | | | | | | 1.5 |
| Red lead | | | | | | | | 5 |

TABLE 14

| | Example 36 | | | | Example 37 | | | | Example 38 | | | |
| --- | --- | --- | --- | --- | --- | --- | --- | --- | --- | --- | --- | --- |
| Aging conditions | Before aging | After 3 days | After 12 days | After 20 days | Before aging | After 3 days | After 12 days | After 20 days | Before aging | After 3 days | After 12 days | After 20 days |
| Strength at break (kg./cm.$^2$) | 120 | 166 | 140 | 115 | 110 | 150 | 120 | 84 | 106 | 90 | 58 | 57 |
| Elongation at break (percent) | 356 | 149 | 117 | 110 | 370 | 284 | 275 | 295 | 493 | 160 | 80 | 100 |
| 100% modulus (kg./cm.$^2$) | 58 | 125 | 135 | 106 | 48 | 65 | 60 | 48 | 43 | 80 | | 57 |
| 300% modulus (kg./cm.$^2$) | 117 | | | | 106 | ᵃ 125 | ᵃ 100 | ᵃ 77 | 88 | | | |
| Hardness (Shore A) | 74 | 82 | 85 | 84 | 73 | 78 | 78 | 76 | 72 | 83 | 87 | 84 |
| Gell content (percent) | 98.1 | 100 | 98.8 | 97.9 | 100 | 99.4 | 96.4 | 92.8 | 96.0 | 98.0 | 97.0 | 93.5 |
| Degree of swelling (percent) | 277 | 236 | 220 | 224 | 276 | 279 | 307 | 342 | 450 | 296 | 269 | 270 |

| | Example 39 | | | | Example 40 | | | | Example 41 | | | |
| --- | --- | --- | --- | --- | --- | --- | --- | --- | --- | --- | --- | --- |
| Aging conditions | Before aging | After 3 days | After 12 days | After 20 days | Before aging | After 3 days | After 12 days | After 20 days | Before aging | After 3 days | After 12 days | After 20 days |
| Strength at break (kg./cm.$^2$) | 130 | 151 | 120 | 79 | 118 | 160 | 150 | 121 | 116 | 143 | 131 | 117 |
| Elongation at break (percent) | 567 | 383 | 370 | 360 | 316 | 273 | 280 | 280 | 165 | 140 | 120 | 140 |
| 100% modulus (kg./cm.$^2$) | 45 | 50 | 52 | 35 | 48 | 65 | 55 | 40 | 88 | 124 | 117 | 104 |
| 300% modulus (kg./cm.$^2$) | 100 | 130 | 112 | 80 | 116 | ᵃ 130 | ᵃ 120 | ᵃ 90 | | | | |
| Hardness (Shore A) | 70 | 76 | 76 | 71 | 70 | 74 | 73 | 65 | 81 | 85 | 84 | 83 |
| Gell content (percent) | 99.8 | 98.0 | 94.8 | 90.6 | 100 | 99.4 | 97.7 | 95.4 | 100 | 100 | 98.9 | 97.4 |
| Degree of swelling (percent) | 326 | 304 | 353 | 408 | 282 | 273 | 311 | 310 | 403 | 220 | 227 | 241 |

| | Example 42 | | | | Comparative Example 7 | | | |
| --- | --- | --- | --- | --- | --- | --- | --- | --- |
| Aging conditions | Before aging | After 3 days | After 12 days | After 20 days | Before aging | After 3 days | After 12 days | After 20 days |
| Strength at break (kg./cm.$^2$) | 109 | 133 | 128 | 109 | 142 | 173 | 77 | 32 |
| Elongation at break (percent) | 191 | 133 | 140 | 140 | 405 | 233 | 300 | 315 |
| 100% modulus (kg./cm.$^2$) | 70 | 114 | 111 | 90 | 45 | 80 | 36 | 19 |
| 300% modulus (kg./cm.$^2$) | | | | | 126 | ᵃ 165 | ᵃ 61 | ᵃ 28 |
| Hardness (Shore A) | 79 | 82 | 83 | 79 | 71 | 77 | 69 | 61 |
| Gell content (percent) | 100 | 100 | 99.9 | 97.4 | 100 | 98.7 | 87.7 | 81.8 |
| Degree of swelling (percent) | 236 | 222 | 227 | 245 | 263 | 248 | 363 | 400 |

ᵃ 200% modulus.

shown in Table 15 was used conjointly. The physical properties of the vulcanized product were measured both before and after aging at 150° C. in the same way as in Example 36. The results are shown in Table 16.

were measured. The results obtained are shown in Table 17.

TABLE 17

| | Example | | | | | | | | | | | | |
|---|---|---|---|---|---|---|---|---|---|---|---|---|
| | 49 | 50 | 51 | 52 | 53 | 54 | 55 | 56 | 57 | 58 | 59 | 60 | 61 |
| Compounding recipe: | | | | | | | | | | | | | |
| Polyepichlorohydrin rubber | 100 | 100 | 100 | 100 | 100 | 100 | 100 | 100 | 100 | 100 | 100 | 100 | 100 |
| FEF carbon black | 40 | 40 | 40 | 40 | 40 | 40 | 40 | 40 | 40 | 40 | 40 | 40 | 40 |
| Tin stearate | 1 | 1 | 1 | 1 | 1 | 1 | 1 | 1 | 1 | 1 | 1 | 1 | 1 |
| Trithiocyanuric acid | 4 | 2 | 2 | 1.5 | 2 | 2 | 1.5 | 1.5 | 1.5 | 1.5 | 2 | 2 | 2 |
| Magnesium oxide | | | | 5 | 5 | 5 | 5 | 5 | 5 | 5 | 5 | 5 | 5 |
| Sodium methylate | 1 | | | | | | | | | | | | |
| Potassium acetate | | 5 | | | | | | | | | | | |
| Potassium cyanurate | | | 5 | | | | | | | | | | |
| Sodium diethyldithiocarbamate | | | | 1.7 | | | | | | | | | |
| Sulfur | | | | | 0.5 | | | | | | | | |
| Trimethylthiourea | | | | | 0.5 | | | | | | | | |
| Ethyleneurea | | | | | | 2 | | | | | | | |
| N,N'-diphenylurea | | | | | | | 0.5 | | | | | | |
| 1,3-diphenyl guanidine | | | | | | | | 0.5 | | | | | |
| Cyclohexylbenzothiazylsulphenamide | | | | | | | | | 0.5 | | | | |
| Melamine | | | | | | | | | | 0.5 | | | |
| Laurylamine | | | | | | | | | | | 0.5 | | |
| Piperazine | | | | | | | | | | | | 0.5 | |
| Acting B ª | | | | | | | | | | | | | 0.5 |
| Properties of the vulcanized product: | | | | | | | | | | | | | |
| Strength at break (kg./cm.²) | 100 | 107 | 104 | 123 | 110 | 112 | 103 | 112 | 118 | 119 | 126 | 135 | 130 |
| Elongation at break (percent) | 500 | 265 | 520 | 220 | 420 | 270 | 540 | 340 | 570 | 310 | 400 | 260 | 210 |
| 100% modulus (kg./cm.²) | 36 | 46 | 35 | 72 | 40 | 70 | 52 | 55 | 32 | 48 | 45 | 61 | 65 |
| 300% modulus (kg./cm.²) | 83 | ᵇ89 | 80 | | 95 | | 90 | 109 | 85 | 112 | 113 | ᵇ120 | |
| Hardness (Shore A) | 71 | 70 | 68 | 75 | 70 | 83 | 80 | 75 | 70 | 76 | 71 | 75 | 80 |

ª Tradename for polyamine, Yoshitomi Pharmaceutical Co., Ltd.    ᵇ 200% modulus.

TABLE 15

| | Example | | | | | |
|---|---|---|---|---|---|---|
| Compounding recipe | 43 | 44 | 45 | 46 | 47 | 48 |
| Polyepichlorohydrin rubber | 100 | 100 | 100 | 100 | 100 | 100 |
| FEF carbon black | 46 | 40 | 40 | 40 | 40 | 40 |
| Tin stearate | 1 | 1 | 1 | 1 | 1 | 1 |
| Trithiocyanuric acid | 1.5 | 2 | 1.5 | 2 | 2 | 2 |
| Magnesium oxide | 5 | 5 | 5 | 5 | 5 | 5 |
| Trimethylthiourea | 0.5 | 1 | | | | |
| Tetramethyl thiuram disulfide | | 0.5 | 1 | | | |
| 2-mercaptobenzimidazole | | | | 1 | | |
| Potassium xanthogenate | | | | | | 1 |

TABLE 16

| | Example 43 | | | | Example 44 | | | | Example 45 | | | |
|---|---|---|---|---|---|---|---|---|---|---|---|---|
| Aging conditions | Before aging | After 3 days | After 9 days | After 20 days | Before aging | After 3 days | After 12 days | After 20 days | Before aging | After 3 days | After 9 days | After 20 days |
| Strength at break (kg./cm.²) | 123 | 167 | 150 | 134 | 130 | 149 | 140 | 118 | 124 | 160 | 147 | 102 |
| Elongation at break (percent) | 267 | 215 | 183 | 187 | 157 | 110 | 105 | 115 | 400 | 298 | 289 | 280 |
| 100% modulus (kg./cm.²) | 67 | 92 | 90 | 79 | 100 | 150 | 139 | 105 | 53 | 68 | 69 | 48 |
| 200% modulud (kg./cm.²) | 110 | 166 | | | | | | | 93 | 135 | 124 | 86 |
| Hardness (Shore A) | 76 | 77 | 80 | 80 | 80 | 82 | 84 | 82 | 72 | 73 | 78 | 76 |
| Gel content (percent) | 99.5 | 97.8 | | 94.8 | 99.7 | 97.9 | 95.3 | 91.5 | 99.3 | 97.3 | | 91.7 |
| Degree of swelling (percent) | 247 | 245 | | 272 | 218 | 216 | 232 | 271 | 283 | 283 | | 311 |

| | Example 46 | | | | Example 47 | | | | Example 48 | | |
|---|---|---|---|---|---|---|---|---|---|---|---|
| Aging conditions | Before aging | After 3 days | After 12 days | After 20 days | Before aging | After 3 days | After 12 days | After 20 days | Before aging | After 3 days | |
| Strength at break (kg./cm.²) | 119 | 146 | 141 | 111 | 94 | 149 | 135 | 111 | 102 | 140 | |
| Elongation at break (percent) | 245 | 170 | 150 | 165 | 575 | 180 | 150 | 150 | 558 | 317 | |
| 100% modulus (kg./cm.²) | 77 | 110 | 100 | 82 | 30 | 110 | 100 | 88 | 35 | 65 | |
| 200% modulus (kg./cm.²) | | | | | ª 70 | | | | ª 79 | | |
| Hardness (Shore A) | 77 | 82 | 82 | 82 | 63 | 76 | 80 | 76 | 67 | 79 | |
| Gel content (percent) | 93.5 | 99.3 | 95.7 | 92.2 | 98.5 | 98.9 | 98.7 | 97.3 | 99.2 | 95.3 | |
| Degree of swelling (percent) | 250 | 238 | 275 | 295 | 434 | 279 | 250 | 277 | 380 | 352 | |

ª 300% modulus.

It is clear by comparison of these examples with Example 38 that by the conjoint use of a vulcanization accelerator, vulcanized products having lesser changes in strength due to aging under heat can be obtained.

EXAMPLES 49 TO 61

In each run, the ingredients of the compounding recipe shown in Table 17 were mixed, and then vulcanized at 160° C. for 40 minutes. The physical properties of the resulting vulcanization product in a normal condition

EXAMPLES 62 TO 65 AND COMPARATIVE EXAMPLE 8

The ingredients of the recipe shown in Table 18 were kneaded and vulcanized in the same way as set forth in Example 36. The aging test was conducted at 160° C. The results are shown in Table 19 together with the results of Comparative Example 8 in which a typical conventional vulcanizing agent was used.

TABLE 18

| | Example | | | | Comp. Ex. 8 |
|---|---|---|---|---|---|
| Compounding recipe | 62 | 63 | 64 | 65 | |
| Polyepichlorohydrin rubber | 100 | 100 | 100 | 100 | 100 |
| FEF carbon black | 40 | 40 | 40 | 40 | 40 |
| Tin stearate | 1 | 1 | 1 | 1 | 1 |
| Trithiocyanuric acid | 1.5 | 1.5 | 1.5 | | |
| 2-diphenylamino-4,6-dimercapto-s-triazine | | | | 3 | |
| Magnesium oxide | 5 | 5 | 5 | 5 | |
| Sodium adipate | 2 | 2 | 2 | 2 | |
| Trimethyl thiourea | | 0.5 | | 9 | |
| Tetramethyl thiuram disulfide | 0.5 | | | | |
| 2-mercaptobenzimidazole | | | 1 | | |
| Lead red | | | | | 5 |
| 2-mercaptoimidazoline | | | | | 1 |

TABLE 19

| Aging conditions | Example 62 | | | | | Example 63 | | | | | Example 64 | | | | |
|---|---|---|---|---|---|---|---|---|---|---|---|---|---|---|---|
| | Before aging | After 3 days | After 6 days | After 9 days | After 12 days | Before aging | After 3 days | After 6 days | After 9 days | After 12 days | Before aging | After 3 days | After 6 days | After 9 days | After 12 days |
| Physical properties of the vulcanized product: | | | | | | | | | | | | | | | |
| Strength at break (kg./cm.²) | 107 | 145 | 128 | 126 | 102 | 105 | 137 | 131 | 128 | 104 | 81 | 137 | 127 | 115 | 108 |
| Elongation at break (percent) | 280 | 159 | 156 | 166 | 152 | 397 | 165 | 178 | 200 | 163 | 733 | 128 | 128 | 120 | 117 |
| 100% modulus (kg./cm.²) | 65 | 95 | 89 | 84 | 72 | 41 | 88 | 81 | 74 | 73 | 37 | 115 | 109 | 100 | 95 |
| 300% modulus (kg./cm.²) | a 105 | | | | | 90 | | | | | 64 | | | | |
| Hardness (Shore A) | 76 | 77 | 80 | 79 | 77 | 71 | 78 | 77 | 78 | 73 | 68 | 83 | 82 | 83 | 83 |
| Gel content (percent) | 97.6 | 98.0 | 100 | 95.5 | | 96.9 | 98.1 | 97.6 | 96.0 | | 94.9 | 98.9 | 99.9 | 97.6 | |
| Degree of swelling (percent) | 243 | 233 | 228 | 246 | | 315 | 235 | 248 | 240 | | 456 | 219 | 212 | 219 | |

| Aging conditions | Example 65 | | | | | Comparative Example 8 | | | |
|---|---|---|---|---|---|---|---|---|---|
| | Before aging | After 3 days | After 6 days | After 9 days | After 12 days | Before aging | After 3 days | After 6 days | After 9 days |
| Physical properties of the vulcanized product: | | | | | | | | | |
| Strength at break (kg./cm.²) | 102 | 123 | 97 | 76 | 51 | 134 | 141 | 41 | 13 |
| Elongation at break (percent) | 492 | 242 | 260 | 267 | 225 | 532 | 258 | 300 | 293 |
| 100% modulus (kg./cm.²) | 40 | 60 | 44 | 40 | 31 | 39 | 59 | 19 | 10 |
| 300% modulus (kg./cm.²) | 86 | | | | | 107 | | | |
| Hardness (Shore A) | 70 | 74 | 72 | 72 | 68 | 70 | 76 | 60 | 55 |
| Gel content (percent) | 97.9 | 96.8 | 94.7 | 86.4 | | 97.7 | 95.6 | 79.9 | 65.5 |
| Degree of swelling (percent) | 306 | 280 | 290 | 307 | | 308 | 269 | 372 | 404 | a 200%.

EXAMPLES 66 AND 67

The ingredients of the recipe shown in Table 20 which contained hexamethylene diamine or piperazine together with trithiocyanuric acid were kneaded, and vulcanized in the same way as set forth in Example 36. The physical properties of the vulcanizates before and after aging at 160° C. were measured. The results are shown in Table 20.

TABLE 20

| | Example 66 | Example 67 |
|---|---|---|
| Compounding recipe: | | |
| Polyepichlorohydrin rubber | 100 | 100 |
| FEF carbon black | 40 | 40 |
| Tin stearate | 1 | 1 |
| Trithiocyanuric acid | 1.5 | 2 |
| Hexamethylene diamine | 1 | |
| Piperazine | | 1 |
| Magnesium oxide | 5 | 5 |

| Aging conditions | Before aging | After 3 days | After 6 days | Before aging | After 3 days | After 6 days |
|---|---|---|---|---|---|---|
| Physical properties of the vulcanized product: | | | | | | |
| Strength at break (kg./cm.²) | 140 | 93 | 65 | 122 | 110 | 70 |
| Elongation at break (percent) | 330 | 170 | 190 | 370 | 183 | 167 |
| 100% modulus (kg./cm.²) | 57 | 68 | 48 | 63 | 75 | 55 |
| 300% modulus (kg./cm.²) | 135 | | | 116 | | |
| Hardness (Shore A) | 77 | 78 | 76 | 84 | 84 | 82 |

What we claim is:

1. A process for vulcanizing polyepihalohydrin rubber selected from the group consisting of:

(1) homopolymers of polyepihalohydrin, and
   (2) copolymers of epihalohydrin with monomers copolymerizable therewith, to produce vulcanized products having excellent solvent resistance and excellent aging stability, said process comprising heating said polyepihalohydrin rubber at a temperature of 120° to 190° C. for a period of from 5 to 120 minutes in the presence of at least 0.5 part by weight, per 100 parts by weight of said polyepihalohydrin rubber, of trithiocyanuric acid or a derivative thereof selected from the group consisting of compounds represented by the formulae:

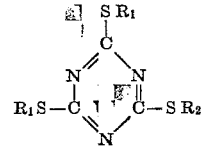

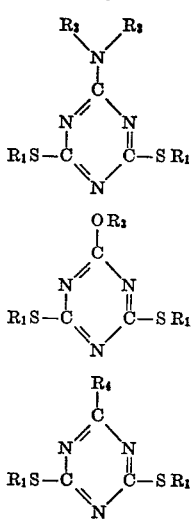

or

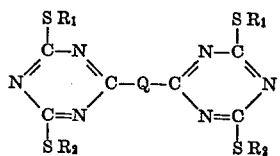

wherein $R_1$ represents a hydrogen atom or an alkali metal; $R_2$ represents a hydrogen atom, an alkali metal, an alkyl group of the formula $C_nH_{2n+1}$ or a phenyl group; $R_3$ represents a hydrogen atom, an alkyl group of the formula $C_nH_{2n+1}$ a phenyl group, a cyclohexyl group, an allyl group or a naphthyl group; $R_4$ represents a phenyl group, a morpholino, group, a piperazino group or a naphthyl group; Q represents $-O(C_nH_{2n})O-$, $-OCH_2(CH_2OCH_2)_nCH_2O-$, $-S(C_nH_{2n})S-$ or $SCH_2(CH_2OCH_2)_nCH_2S$; $n$ represents a positive integer.

2. The process of claim 1, wherein the amount of the trithiocyanuric acid or said derivative thereof present during said heating is 0.5 to 5 parts by weight per 100 parts by weight of the polyepihalohydrin rubber.

3. The process of claim 1, wherein said polyepihalohydrin rubber is polyepichlorohydrin rubber.

4. The process of claim 1, wherein said polyepihalohydrin rubber is an epichlorohydrin-ethylene oxide or propylene oxide copolymer rubber containing a substantial portion of epichlorohydrin.

5. The process of claim 1, wherein up to 10 parts by weight, based on 100 parts by weight of the polyepihalohydrin rubber, of a vulcanization assistant is also present during said heating.

6. The process of claim 5 wherein said vulcanization assistant is sulfur.

7. The process of claim 1 wherein said monomer copolymerizable with said polyepihalohydrin is selected from the group consisting of epoxides, isocyanates, alkylacrylates, vinyl ketones, cyclic acid anhydrides, diolefins, monoolefins, nitrile compounds and butylene.

8. The process of claim 5 wherein said vulcanization assistant is selected from the group consisting of alkali metal and alkaline earth metal salts of aromatic, aliphatic or polybasic acids, alkali metal salts of cyanuric acid, oxides, hydroxides, sulfides, carbonates and phosphates of alkali metals and alkaline earth metals, thioacid salts, dithioacid salts, thiazoles, 2-mercaptobenzimidazole, urea compounds, thiourea compounds, guanidine compounds, thiuram compounds, monoamines and polyamines.

9. The process of claim 10 wherein said monomer copolymerizable with said polyepihalohydrin is selected from the group consisting of epoxides, isocyanates, alkylacrylates, vinyl ketones, cyclic acid anhydrides, diolefins, monoolefins, nitrile compounds and butylene.

10. A process for vulcanizing polyepihalohydrin rubber selected from the group consisting of:
  (1) homopolymers or polyepihalohydrin, and
  (2) copolymers of epihalohydrin with monomers copolymerizable therewith, to produce vulcanized products having excellent solvent resistance and excellent aging stability, said process comprising heating said polyepihalohydrin rubber at a temperature of 120° to 190° C. for a period of from 5 to 120 minutes in the presence of (a) at least 0.5 part by weight per 100 parts by weight of said polyepihalohydrin rubber, of trithiocyanuric acid or a derivative thereof selected from the group consisting of the compounds repersented by the formulae:

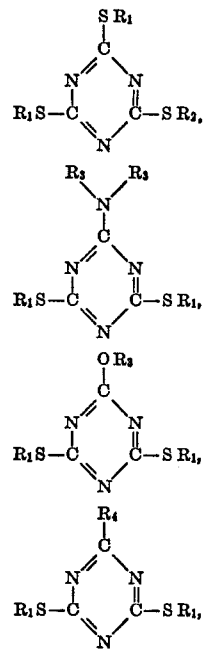

or

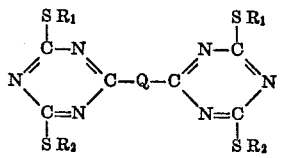

wherein $R_1$ represents a hydrogen atom or an alkali metal; $R_2$ represents a hydrogen atom, an alkali metal, an alkyl group of the formula $C_nH_{2n+1}$, or a phenyl group; $R_3$ represents a hydrogen atom, an alkyl group of the formula $C_nH_{2n+1}$, a phenyl group, a cyclohexyl group, an allyl group or a naphthyl group; $R_4$ represents a phenyl group, a morpholino group, a piperazino group or a naphthyl group; Q represents $-O(C_nH_{2n})O-$, $-OCH_2(CH_2OCH_2)_nCHO-$, $-S(C_nH_{2n})S-$ or $-SCH_2(CH_2OCH_2)_nCH_2S-$; $n$ represents a positive integer; and also in the presence of (b) from 0.1 to 10 parts by weight per 100 parts by weight of said polyepihalohydrin rubber, of a 2-mercaptoimidazoline or a carbamate of a polyamine.

11. The process of claim 10, wherein the amount of compound (a) present during said heating is 0.5 to 5 parts by weight per 100 parts by weight of the polyepihalohydrin rubber copolymer, and the amount of compound (b) is 0.1 to 10 parts by weight per 100 parts by weight of the epihalohydrin homopolymer or copolymer.

12. The process of claim 10, wherein up to 10 parts by weight, based on 100 parts by weight of the polyepihalohydrin rubber of a vulcanization assistant is also present during said heating.

13. The process of claim 10, wherein said polyepihalohydrin rubber is polyepichlorohydrin rubber.

14. The process of claim 10, wherein said polyepihalohydrin rubber is an epichlorohyrin-ethylene oxide or propylene oxide copolymer rubber containing a substantial portion of epihalohydrin.

15. The process of claim 10, wherein said compound (b) is 2-mercaptoimidazoline.

16. The process of claim 10, wherein said compound (b) is hexamethylenediamine carbamate.

17. The process of claim 12 wherein said vulcanization assistant is selected from the group consisting of alkali metal and alkaline earth metal salts of aromatic, aliphatic or polybasic acids, alkali metal salts of cyanuric acid, oxides, hydroxides, sulfides, carbonates and phosphates of alkali metals and alkaline earth metals, thioacid salts, dithioacid salts, thiazoles, 2-mercaptobenzimidazole, urea compounds, thiourea compounds, guanidine compounds, thiuram compounds, monoamines and polyamines.

References Cited
UNITED STATES PATENTS

| | | | |
|---|---|---|---|
| 3,341,491 | 9/1967 | Robinson et al. | 260—45.75 |
| 3,366,598 | 1/1968 | Westlinning et al. | 260—41.5 |
| 3,341,475 | 9/1967 | Vandenberg | 260—2 |
| 3,240,749 | 3/1966 | Dexter | 260—45.8 |

DONALD E. CZAJA, Primary Examiner

M. I. MARQUIS, Assistant Examiner

U.S. Cl. X.R.

260—2 A, 37 EP, 41 R, 45.8 NT, 77.5 A, 79.5 C, 88.3 A